Figure 1:
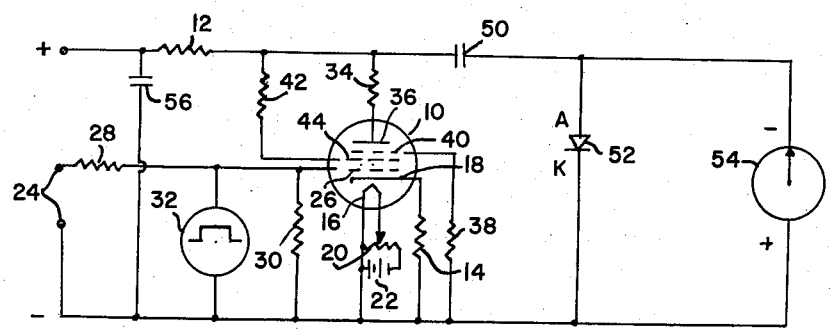

Nov. 12, 1963 W. OTTO 3,110,859
TUBE TESTER FOR BLACKOUT EFFECT COMPRISING MEANS TO
DETERMINE CATHODE INTERFACE IMPEDANCE
Filed Aug. 5, 1959 2 Sheets-Sheet 1

*INVENTOR.*
WALTER OTTO

BY

ATTORNEYS

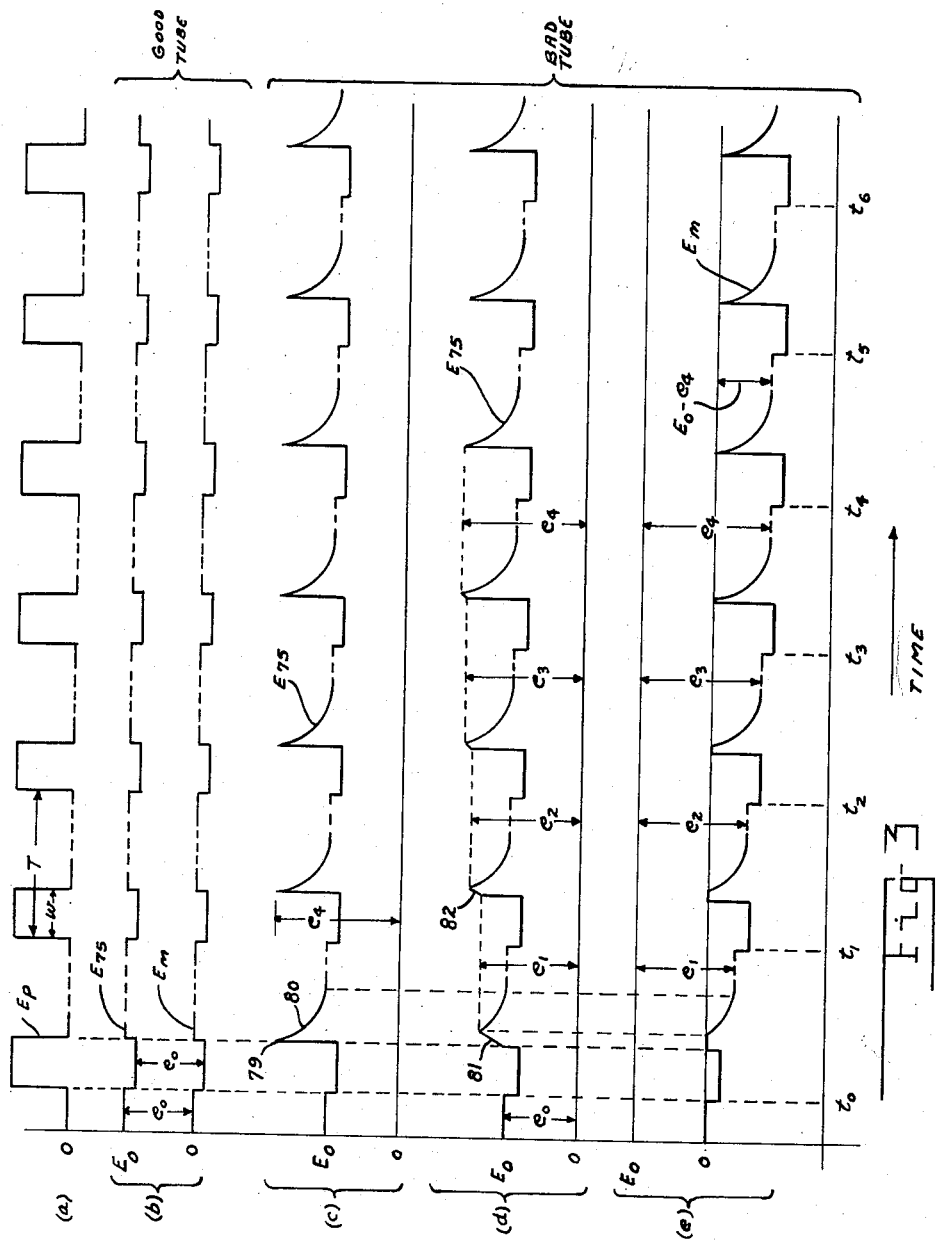

United States Patent Office 3,110,859
Patented Nov. 12, 1963

3,110,859
TUBE TESTER FOR BLACKOUT EFFECT COMPRISING MEANS TO DETERMINE CATHODE INTERFACE IMPEDANCE
Walter Otto, 123 Rebecca St., Dayton 7, Ohio
Filed Aug. 5, 1959, Ser. No. 831,915
3 Claims. (Cl. 324—20)
(Granted under Title 35, U.S. Code (1952), sec. 266)

The invention described herein may be manufactured and used by or for the United States Government for governmental purposes without payment to me of any royalty thereon.

This invention relates to a system for determining the blackout characteristics of tubes and particularly to a system for determining the interface impedance characteristics of oxide coated cathodes.

In the operation of tubes in pulse responsive systems, such as radar, considerable difficulty has been encountered because of the so called blackout characteristic or failure of the tube to respond to certain pulse stimulations. Also in amplifiers, the interface characteristic may cause difficulty, such as flicker noise, or by decreasing the transconductance of the tube.

Extensive investigation has indicated that these blackout characteristics are related to, or dependent on, the interface impedance characteristics of the coated cathodes of the tubes. That is, the existence of a substantially insulating layer between the base metal of the cathode and the coating material provides a high impedance interface characteristic which is apparently directly connected with the blackout characteristics of the tube under pulse operating conditions.

The normal tube tests do not test for interface impedance and tubes having high interface impedance may test good.

Present tube test requirements to detect "blackout" characteristics specify a static "D.C. emission" test. This test is inherently destructive, requires careful, skilled operators, provides unreliable inconsistent results and is generally unsatisfactory. Present cathode interface tests are based upon actual measurement of interface impedance values under specified test conditions, usually through employment of tedious inefficient time consuming bridge methods and special, costly, complicated apparatus which requires skilled operators.

The present invention provides a simple direct reading test circuit which may be operated by unskilled operators to determine the interface impedance characteristic of tubes so that "good" tubes may be readily separated from "bad" tubes. This test eliminates those tubes which under normal test are indicated to be good, but which in fact have a deleterious interface impedance.

It is accordingly an object of the invention to provide a simple test for interface impedance characteristics.

It is another object of the invention to provide a tube test which may be operated by substantially inexperienced operators.

It is a further object of the invention to provide an interface impedance test requiring a short test period.

Figure 2:
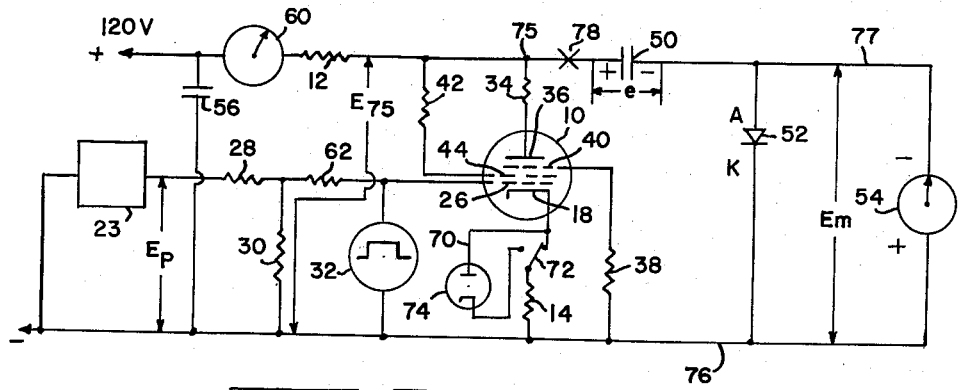

Other objects and advantages of the invention will be apparent from the following detailed description taken in conjunction with the accompanying drawing in which FIG. 1 is a schematic illustration of a simplified circuit according to the invention, FIG. 2 is a similar figure showing further details and modifications, and FIG. 3 shows waveforms occurring in FIG. 2.

In the exemplary embodiment according to the invention the tube 10 to be tested is connected in a normal receptacle to which the test potentials have been connected and adjusted, not shown, through which a source of anode potential is applied over a resistor 12 and the cathode is connected to a negative terminal of the source over a resistor 14. A cathode heater 16 determines the temperature of the oxide coated cathode 18 and the temperature of the heater 16 will be determined by means of a voltage divider 20 connected across a suitable voltage source 22.

Terminals 24 are connected to a pulse generator 23 and to control grid 26 by means of an attenuating resistor 28 and shunt resistor 30. A cathode ray tube 32 may be connected to show the waveform of the impulse applied to the control grid 26 from the impulse generator 23. Pulse generator 23 preferably produces a short duty pulse having an open circuit output of five volts as indicated on cathode ray tube 32 with negligible overshoot or undershoot.

Stabilizing resistor 34 is connected in series with the anode 26, a similar stabilizing resistor 38 is connected from the negative terminal to the suppressor grid 40 and the stabilizing resistor 42 is connected from the positive voltage source to the screen grid 44. A capacitor 50 in series with a unidirectional conductor, such as a diode 52, is connected in shunt with the tube 10 to be tested and a high impedance input negative reading D.C. volt meter 54 is connected in shunt with the diode 52.

A filtering capacitor 56 is connected across the power supply for the tube 10 to remove fluctuations or A.C. components from the voltage applied across the anode and cathode of the tube 10. If desired, a milliameter 60 may be connected in series with the tube 10 to indicate the operating condition and particularly a normal stable condition of the tube 10. Also, if desired, a current limiting resistor 62 may be connected in series between the attenuator impedance 28 and the grid 26.

An auxiliary circuit 70 may be connected to switch 72 so that a diode connected vacuum tube 74 may be connected in series with a good tube 10 so that current impulses may be applied to the diode 74 to determine the interface impedance characteristics thereof.

The detrimental characteristics to be detected may be warm-up time sensitive, and upper and lower warm-up time limits may profitably be established, during which time interval the testing of the tube 10 or 74 should be completed.

The detrimental characteristics to be detected may be cathode temperature sensitive, and greater detection sensitivity may be obtained at one cathode temperature than at another; particular filament operating conditions, for example, the lowest filament voltage permitted in the test specifications for a particular tube type, may profitably be specified for this test to obtain such increased detection sensitivity.

In utilizing the test system, the tube 10 to be tested is inserted in a tube socket (not shown) to which the various circuits have been connected and the potentials adjusted and the reading of the meter 54 is observed during the established time interval.

If tube 10 is "good" that is, having no detrimental "blackout" or "interface" attributes, the output signal thereof will be a negative pulse without positive overshoot since the input pulse from 23 is specified to have negligible negative overshoot and the output of a tube evidences a polarity reversal with respect to the input thereto.

Provided the input pulse from generator 23 has a sufficiently short duty factor, a large ratio will exist between the relative peak amplitude, as observed through capacitor 50, of the output's negative voltage component and the output's positive voltage component.

Diode 52 will rectify the positive voltage component and capacitor 50, normally charged to the anode potential, will be additional charged to the peak value of the output's positive voltage component.

Negative D.C. reading high input impedance voltmeter 54 will indicate this additional charge on capacitor 50 and will thus provide a measurement of the peak amplitude of the positive voltage component of the unrestored output signal.

Because of the input signal's short duty factor and provided tube 10 is "good" and the operating conditions thereof are correctly chosen, voltmeter 54's indication will be negligibly small.

A large ratio between peak grid current and peak anode current may be a preferable test circumstance.

The grid operating conditions of tube 10 may preferably be chosen near zero control grid bias, by proper selection of resistor 14, and resistors 12 and 62 may be chosen so that application of the positive input pulse will cause limiting due to grid current and a relatively small change in the tube 10's anode current will result when the input pulse is applied.

Amplifier stages, not shown, may be utilized to provide additional discrimination in favor of the output's negative voltage component, as well as to provide increased detection sensitivity.

The alternating output signal will then have a desirable relatively small amplitude and voltmeter 54's reading will indeed be negligibly small.

Under proper operating conditions, such a negligibly small reading may be reliably interpreted as indicative that tube 10 is a "good" tube, free from detrimental "blackout" or "interface" attributes.

If tube 10 is a "bad" tube possessing detrimental "blackout" or "interface" attributes, in series with normal grid to cathode impedance, an equivalent grid to cathode circuit exhibiting a time constant will exist. Such an equivalent circuit has been amply described in the literature and may ordinarily consist primarily of one or two parallel resistor and capacitor combinations in series, although more complicated resistor-capacitor combinations may obtain.

During application of the short duty factor pulse voltage from pulse generator 23 through resistor networks 28 and 30 to the grid 26 to cathode 18 circuit of tube 10 this equivalent circuit exhibiting a time constant will attain a voltage charge, the polarity of which will oppose the voltage of the positive input pulse.

After the input pulse's nominal duration, the voltage amplitude thereof will become zero.

The voltage charge existing across the equivalent circuit, however, will persist for a time interval after the input pulse amplitude becomes zero, such time interval being determined by the time constants of the equivalent circuit, and this decaying voltage charge will be impressed between grid 26 and cathode 18 of tube 10 as a negative signal.

The anode circuit of tube 10 will exhibit a positive output due to this decaying negative signal, and upon rectification by diode 52, the peak positive value of the anode 36's output voltage will be indicated by negative reading high input impedance voltmeter 54.

The operation of the circuit of FIG. 2 will be explained in more detail with reference to the waveforms of FIG. 3. The pulse waveform $E_p$ at the output of pulse source 23 is shown at $(a)$ in this figure. These pulses, which should exhibit negligible overshoot and undershoot, have a very short duty cycle, i.e. the duration $w$ of a pulse is very small relative to the interval T between pulses. To permit the illustration of a greater number of pulses, the interval T is shown shortened in FIG. 3 as evidenced by the broken lines between adjacent pulses. The pulse output of generator 23 is applied across a potential divider made up of resistors 28 and 30, the fraction of the total pulse voltage appearing across resistor 30 being applied between grid 26 of the tube 10 under test and conductor 76, the potential of which will be considered the zero or reference potential for the circuit. It is preferable but not necessary that the circuit be operated under conditions such that the positive-going pulses on grid 26 do not cause an appreciable increase in anode and screen current. To this end, the tube is operated with a very small grid bias, achieved by a low value for resistor 14, and there is provided a series grid resistor 62. Consequently, the grid is driven positive relative to the cathode at a relatively low value of pulse voltage and the resulting grid current produces a voltage drop across resistor 62 that prevents any appreciable further increase in grid voltage relative to the cathode and thereby any appreciable further increase in anode and screen currents.

In the absence of pulses on grid 26, the potential $E_{75}$ of point 75 has a quiescent value, designated $E_0$ in FIG. 3, capacitor 50 is charged to a potential $e=e_0=E_0$ and the potential $E_m$ across meter 54 is zero.

The operation of the circuit when 10 is a "good" tube, i.e., one free of any significant cathode interface impedance, is illustrated at $(b)$ in FIG. 3 which shows the waveform $E_{75}$ at point 75 and the waveform $E_m$ across the meter 54. Just prior to the application of the first pulse to grid 26 at $t_0$, $E_{75}$ is at its quiescent value $E_0$ and capacitor 50 has a charge $e_0=E_0$ of the polarity indicated. At $t_0$ a pulse occurs on grid 26 causing a negative-going pulse in the waveform $E_{75}$, however, this pulse is of small magnitude due to the grid limiting action described above. At the end of the pulse $E_{75}$ returns to its quiescent value $E_0$. A similar action occurs for all succeeding pulses, as the waveform $E_{75}$ illustrates.

The difference between the voltage at point 75 and the potential $e$ across capacitor 50 gives the waveform $E_m$ across meter 54. Since capacitor 50 charges through diode 52 but must discharge through the very high impedance of voltmeter 54, the time constant of its discharge circuit is much greater than the time constant of its charging circuit and also much greater than the pulse duration $w$ or the pulse repetition interval T. Hence, there is no significant discharge of this capacitor during a pulse or during the interval between pulses. Consequently, the potential of conductor 77 is zero relative to the reference potential of conductor 76 during the intervals between pulses and negative relative to conductor 76 for the duration of each pulse by the amount of the negative-going portions of waveform $E_{75}$. Therefore, the waveform $E_m$ across meter 54 for a "good" tube is a series of small amplitude negative pulses of short duty cycle. The meter reads the average value of this waveform which is very small so that the meter reading for a "good" tube is practically zero. Had a larger control grid bias been used with tube 10 there would have been less limitation of the negative swings of waveform $E_{75}$, resulting in larger negative pulses in waveform $E_m$ and a higher meter reading. Hence, the earlier stated preference for a small grid bias.

The operation of the circuit when tube 10 has a significant cathode interface impedance is illustrated at $(c)$, $(d)$ and $(e)$ in FIG. 3. Graph $(c)$ represents the voltage waveform at point 75 with the circuit opened at point 78 and also, as will be seen later, the waveform when the circuit has reached a steady state. The waveform at $(c)$ has the same negative-going portions, due to the positive pulses applied to the grid of tube 10, as were present in the waveform $E_{75}$ at $(b)$. However, in the presence of a cathode interface impedance, the capacitance of the interface impedance is charged during each applied pulse and then discharges through the shunt interface resistance before the next pulse occurs. At the end of each pulse the voltage across the interface capacitance, which is then at a maximum, acts as an additional negative potential at the control grid which reduces the anode current below its quiescent value and as a result, increases the potential of point 75 above its quiescent value $E_0$ to a maximum potential represented by point 79 on waveform $E_{75}$, as illustrated in graph $(c)$. The potential of point 75 then falls exponentially from this maximum value along line 80 as the interface capacitance discharges, eventually reaching $E_0$ at complete discharge.

With the circuit closed at point 78 a certain period of time is required after the application of the initial pulse to grid 26 for the waveform $E_{75}$ to reach its steady state. This is due to fact that the charge in capacitor 50 cannot be increased instantaneously. Therefore, the circuit is in a transient state from the first applied pulse to the time the charge in capacitor 50 has increased to the peak value 79 of the voltage at point 75, illustrated in the waveform at (c). The waveform $E_{75}$ during this transient period is illustrated in graph (d) of FIG. 3.

Referring to graph (d), just prior to the application of the first pulse to grid 26 at $t_0$, point 75 is at its quiescent potential $E_0$ and capacitor 50 has its quiescent charge $e_0 = E_0$. At the end of the pulse the potential of point 75 tends to rise above $E_0$ due to the effect of the charge stored in the interface capacitance, as explained with reference to graph (c). This causes capacitor 50 to increase its charge, along line 81, to a new higher value $e_1$, the amount of the increase being dependent upon the peak potential across the interface capacitance, the rate of discharge of this capacitance and the time constant of the capacitor 50 charging circuit. After the potential $e_1$ has been reached, the potential of point 75 falls exponentially, eventually reaching the quiescent potential $E_0$ when interface capacitance has completely discharged. At this point the anode of diode 52 is negative relative to its cathode and conductor 76 by the amount $E_0 - e_1$. As stated earlier, the discharge time constant for capacitor 50 is so great, due to the fact that it must discharge through the very high impedance of meter 54, that no significant discharge occurs between successive pulses. Therefore, the potential $e_1$ across capacitor 50 remains substantially constant until the second pulse occurs at $t_1$.

During the second pulse the cathode interface capacitance again charges and at the end of this pulse the potential of point 75 rises immediately to the value $e_1$. At this point diode 52 begins to conduct and the charge on capacitor 50 is increased along line 82 to a new higher value $e_2$. As in the former case, after $e_2$ has been reached the potential of point 75 falls exponentially, eventually reaching the value $E_0$ when the interface capacitance has completely discharged. At this point the anode of diode 52 is negative relative to its cathode and conductor 76 by the amount $E_0 - e_2$.

The above described process continues until the capacitor 50 has acquired a charge $e_4$ equal to the peak potential of point 75. This is illustrated in graph (d) as occurring after the fourth applied pulse. Consequently at $t_4$ and after, steady state conditions exist and the waveform $E_{75}$ is identical to the waveform in graph (c). During steady state operation the amount of charge added to capacitor 50 after each pulse is only that required to replace the charge lost between pulses. Since this is insignificantly small, as explained earlier, no attempt has been made to illustrate it in FIG. 3.

Graph (e) of FIG. 3 illustrates the waveform $E_m$ across meter 54 during the transition period and also under the steady state conditions that prevail at $t_4$ and beyond. Prior to $t_0$, point 75 is at its quiescent potential $E_0$ and capacitor 50 has its quiescent charge $e_0 = E_0$. Therefore, the potential across the meter is zero. During the first pulse on grid 26 a negative pulse is applied to the meter due to the negative-going pulse in waveform $E_{75}$, graph (d), and the fact that the charge $e_0$ in capacitor 50 does not change during the pulse. Following the first pulse the meter potential is zero during the time that capacitor 50 is charging along line 81 in waveform $E_{75}$, as seen in graph (d). This is due to the fact that diode 52 is effectively a short circuit across the meter when capacitor 50 is charging. After capacitor 50 has reached the higher charge $e_1$ the potential of point 75 falls exponentially, eventually reaching the value $E_0$, as explained for graph (d). Since the capacitor charge $e_1$ does not significantly change, this results in an exponential rise in negative potential across the meter until the negative potential $E_0 - e_1$ is reached. This potential holds until the second pulse occurs on grid 26. The action during and following the second pulse is similar to that during and following the first pulse. During the second pulse the potential of point 75 is slightly lower, as shown in graph (d), which causes a corresponding and equal rise in negative potential across the meter in excess of the value $E_0 - e_1$. The meter potential following the second pulse returns to zero while condenser 50 receives an additional charge to $e_2$ along line 82 in graph (d). After this charge has been reached the exponential fall of $E_{75}$ causes the negative potential across the meter to rise in a corresponding manner from zero, since $e_2$ does not change appreciably, eventually reaching the value $E_0 - e_2$ when $E_{75}$ has fallen to $E_0$. Similar actions follow the pulses at $t_2$ and $t_3$, the condenser 50 reaching its maximum charge $e_4$ and the negative potential across the meter reaching its maximum interpulse value $E_0 - e_4$ after the pulse at $t_3$. Therefore, at the $t_4$ pulse and beyond the negative voltage $E_m$ across meter 54 has its steady state form with an interpulse value $E_0 - e_4$.

The meter 54 reads the average value of the waveform $E_m$. It will be apparent that the average value of the waveform $E_m$ for a tube having a cathode interface impedance, as illustrated at (e) in FIG. 3, is much greater than the average value of the waveform $E_m$ for a tube having no defect of this type, as illustrated at (b). Consequently, the meter gives a clear indication of a tube that is "bad" in this respect.

The operation of the circuit in testing a diode 74 (FIG. 2) for cathode interface impedance, using a grid controlled tube 10 without this defect is similar in all respects to the testing of a grid controlled tube, as described above, and the same waveforms apply. The only difference is that the cathode interface impedance in this case is at the diode cathode rather than at the cathode of the tube 10. Since the interface impedance of the diode cathode is a series element in the grid to cathode circuit of tube 10, the charge on the capacitance of this impedance is applied as a negative potential to the grid.

A reading on voltmeter 54 may optionally be made to indicate either the presence and relative magnitude of detrimental "interface" time constants present in tube 10, or the reading of voltmeter 54 may be made directly proportional to the value of the resistance components of tube 10's "interface" impedance.

Voltmeter 54's indication will be generally proportional to the time constant of the interface impedance provided; the interface resistance values are large in magnitude compared to resistors 30, 28, 62 and tube 10's positive grid 26 to cathode 18 resistance; the input pulse time duration is small compared to a time constant primarily dependent on tube 10's input circuit resistance and the interface equivalent circuits charging time constants.

In such a resistor-capacitor circuit, for a constant input voltage and a charge time small compared to time constants present, the charge voltage attained at the end of a small constant charge time, being a small initial portion of an exponential waveshape, will be essentially proportional to the time constant present.

When measurement of the resistance component of the interface independence is a primary consideration, judicious choice of resistors 30, 28 and 62 values may be made to cause voltmeter 64's indication to be primarily and directly dependent upon the magnitude of such resistance components.

For example, if resistor 62 is selected to be always large in value compared to the magnitude of the interface resistance components and the grid 26 to cathode 18 impedance of tube 10, the current through resistor 62 will be essentially constant regardless of differences in the magnitude of such parameters within tube 10, for various tube 10's under test.

This constant current will cause the effective pulse input charging voltage and the final charge voltage attained across the "interface" impedance, to vary directly with resistance components of the "interface" impedance, provided the input pulses time duraton is large compared to the charging time constant present.

Consequent actions as previously explained will cause voltmeter 54's indication to be directly proportional to the magnitude of such resistance components.

The recurrence rate of the input pulses may profitably be chosen so that the peak amplitude of the charge existing across the equivalent "interface" circuit, when tube 10 is a "worst" tube, decays substantially to "zero" between repetition rate time intervals.

Grossly "bad" tubes may readily be identified by a significantly lower reading on milliammeter 16 compared to a "bogie" reading, or alternatively, by noting a significant decrease in the reading of meter 60 when pulse generator 23 is switched from "off" to "on."

Normally, the indication provided by voltmeter 54 alone will be sufficient to identify and differentiate between a "good" and a "bad" tube. Since the tubes 10 will vary from "good" to "worst" a limit on the reading of voltmeter 54 to distinguish between an acceptable or "good" and a "bad" tube may readily be established by correlating readings of voltmeter 54 with results obtained from tests simulating operational conditions or from laboratory measurements.

Negligible or low reading on voltmeter 54 during a normal test sequence, indicates that the tube 10 under test has less "blackout" or "interface" attributes than tubes 10 providing higher meter 54 readings, since such meter 54 readings are approximately proportional to such attributes.

For complete determination of the actual value of the resistance and capacity constants of the interface impedance of the tubes being tested, an oscilloscope or, a cathode ray (not shown) tube may be inserted in parallel with meter 54. The resulting display may be utilized to determine the time constant of the equivalent circuit from which the interface capacity can be derived.

A diode connected tube 74 may be tested using the essence of this invention by utilizing a "good" tube 10 and properly inserting the diode connected tube 74 under test into the circuit, for example, in place of, or in series with, resistor 14, as by circuit 70 and switch 72.

Under proper operating conditions, indications of voltmeter 54 are directly proportional to "blackout" or "interface" attributes of the tube under test and the scale of meter 54 may desirably be calibrated to permit direct reading of pertinent parameters, such as "interface ohms."

For purposes of exemplification particular embodiments have been shown and described according to the best present understanding thereof. However, it will be apparent to those skilled in the art that changes and modifications in construction and arrangement of the parts may be resorted to without departing from the true spirit and scope of the invention.

I claim:

1. Apparatus for testing vacuum tubes which have at least an anode, a cathode and a control grid, comprising: means providing a point of reference potential; means providing a point of fixed positive potential relative to said reference potential; a load resistor connected between the anode of the tube to be tested and said point of fixed positive potential; a conductive connection between the cathode of said tube and said point of reference potential; a source of positive-going pulses of short duration and negligible overshoot and undershoot connected between the control grid of said tube and said point of reference potential, the control grid bias of said tube being such that the anode current of said tube is relatively high in the absence of pulses from said pulse source; a capacitor and a unidirectional conductor connected in series between the anode end of said load resistor and said point of reference potential, said unidirectional conductor being poled to conductor current flowing from the anode end of said load resistor toward said point of reference potential; and a high impedance direct current voltmeter connected across said unidirectional conductor.

2. Apparatus for testing vacuum tubes which have at least an anode, a cathode and a control grid, comprising: means providing a point of reference potential; means providing a point of fixed positive potential relative to said reference potential; a load resistor connected between the anode of the tube to be tested and said point of fixed positive potential; a conductive connection between the cathode of said tube and said point of reference potential; an input circuit connected between the control grid and cathode of said tube and including as series elements a grid resistor, a source of positive-going pulses of short duration and negligible overshoot and undershoot and said conductive connection in the order named, said input circuit containing means providing a small negative bias of the control grid relative to the cathode of such value that the anode current of said tube is relatively high in the absence of pulses from said pulse source; a capacitor and a unidirectional conductor connected in series between the anode end of said load resistor and said point of reference potential, said unidirectional conductor being poled to conduct current flowing from the anode end of said load resistor toward said point of reference potential; and a high impedance direct current voltmeter connected across said unidirectional conductor.

3. Apparatus for testing vacuum diodes having an anode and a cathode, comprising: means providing a point of reference potential; means providing a point of fixed positive potential relative to said reference potential; a vacuum tube having at least an anode, a cathode and a control grid; a load resistor connected between the anode of said tube and said point of positive potential; a conductive connection between the cathode of said tube and the anode of the diode to be tested; a conductive connection between the cathode of said diode and said point of reference potential; a source of positive-going pulses of short duration and negligible overshoot and undershoot connected between the control grid of said tube and said point of reference potential, the control grid bias of said tube being such that the anode current of said tube is relatively high in the absence of pulses from said pulse source; a capacitor and a unidirectional conductor connected in series between the anode end of said load resistor and said point of reference potential, said unidirectional conductor being poled to conduct current flowing from the anode end of said load resistor toward said point of reference potential; and a high impedance direct current voltmeter connected across said unidirectional conductor.

References Cited in the file of this patent

UNITED STATES PATENTS

| | | |
|---|---|---|
| 2,255,502 | Bousman | Sept. 9, 1941 |
| 2,750,558 | Woodbury | June 12, 1956 |
| 2,793,343 | Wagner | May 21, 1957 |
| 2,973,473 | Oakes | Feb. 28, 1961 |

OTHER REFERENCES

The Dependence of Mutual Conductance on Frequency of Aged Oxide-Coated Vanes and Its Influence on Their Transistent Response, by Tillman et al., pages 8–15, 34–38, 144–153, vol. 100, part IV of No. 5, of the Proceedings of the Institution of Electrical Engineers, October 1953.

Unusual Tube Effects Cause Circuit Troubles, by Babcock, appearing in Electronics, Engineering Issue, September 12, 1958, pages 90–93.